A. CZARNETZKI.
ATTACHMENT FOR GRAIN DRILLS.
APPLICATION FILED JUNE 3, 1916.
1,205,862.
Patented Nov. 21, 1916.
2 SHEETS—SHEET 1.
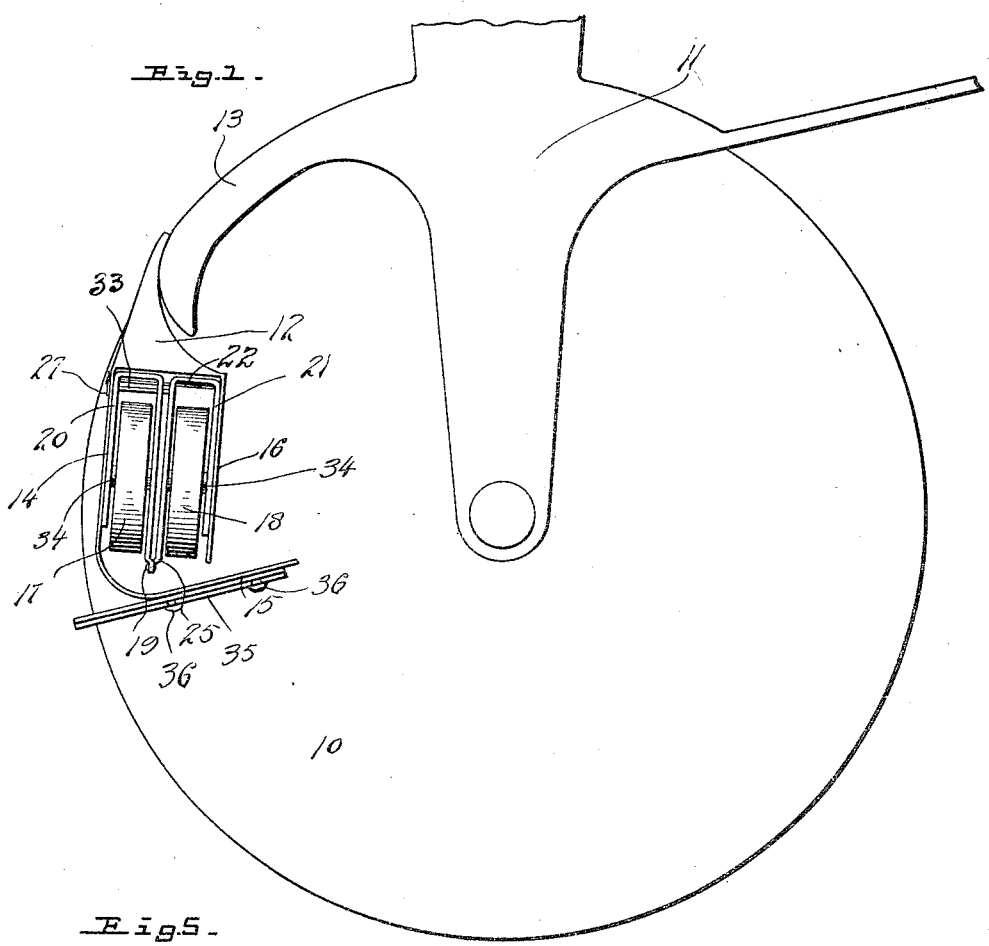
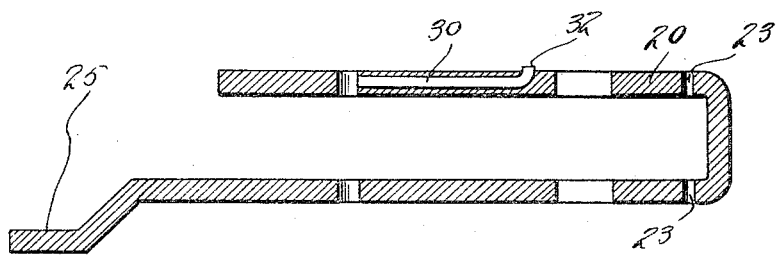
WITNESSES
INVENTOR
Arthur Czarnetzki
BY
ATTORNEY A. CZARNETZKI.
ATTACHMENT FOR GRAIN DRILLS.
APPLICATION FILED JUNE 3, 1916.
1,205,862.
Patented Nov. 21, 1916.
2 SHEETS—SHEET 2.
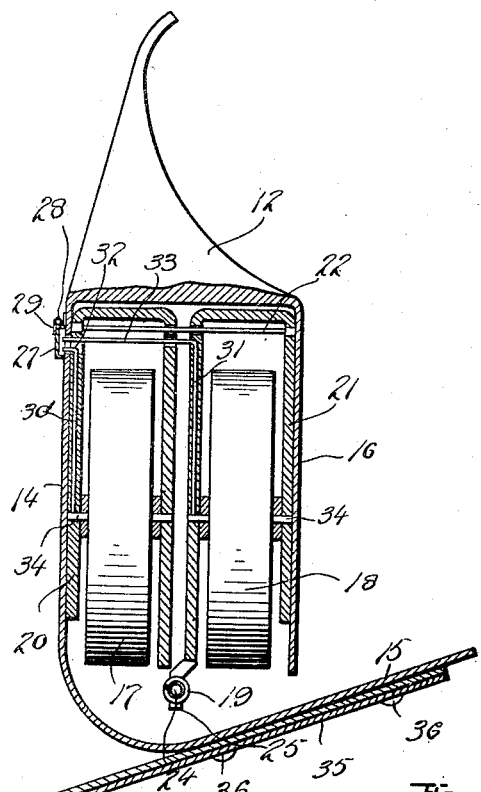
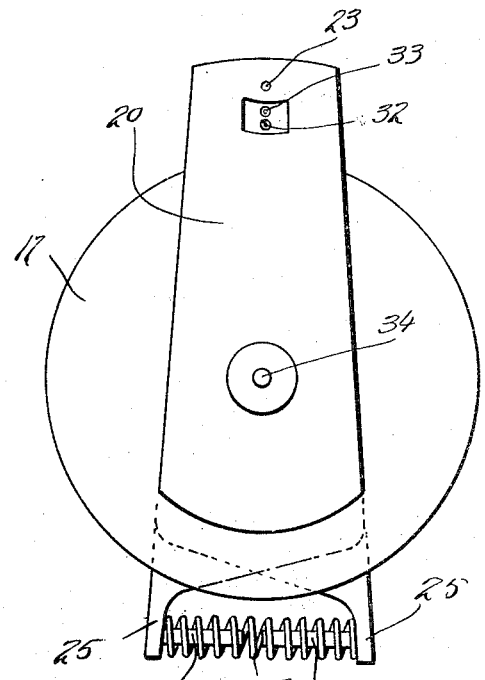
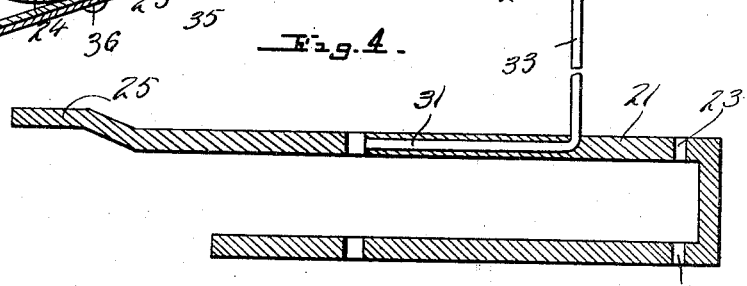
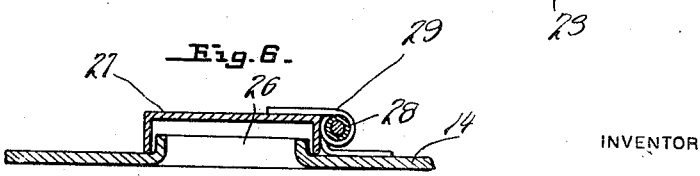
WITNESSES
Chas. E. Kemper
Ross J. Woodward
INVENTOR
Arthur Czarnetzki.
BY
Richard B. Owen,
ATTORNEY

UNITED STATES PATENT OFFICE.

ARTHUR CZARNETZKI, OF GARDENA, NORTH DAKOTA.

ATTACHMENT FOR GRAIN-DRILLS.

1,205,862.   Specification of Letters Patent.   Patented Nov. 21, 1916.

Application filed June 3, 1916.   Serial No. 101,594.

*To all whom it may concern:*

Be it known that I, ARTHUR CZARNETZKI, a citizen of the United States, residing at Gardena, in the county of Bottineau and State of North Dakota, have invented certain new and useful Improvements in Attachments for Grain-Drills, of which the following is a specification.

This invention relates to an improved attachment which will be mounted between the disks of a double disk grain drill and the principal object of the invention is to provide an attachment so constructed that the rear portions of the disks may be spread thus bringing the forward lower portions of the disks together and holding the disks in the proper relative position, for opening the furrow.

Another object of the invention is to so construct this attachment that the roller carrying yokes may be pivotally mounted in the frame and yieldably held in the proper position with the rollers in engagement with the disks.

Another object of the invention is to provide an improved type of frame for pivotally mounting the yokes, the frame being provided with a dirt guard.

Another object of the invention is to provide improved means for lubricating the axles of the rollers.

This invention is illustrated in the accompanying drawings, wherein:—

Figure 1 is a view in side elevation showing the attachment in place. Fig. 2 is a vertical sectional view through the attachment. Fig. 3 is a view showing the yokes and rollers in side elevation and moved to extend in overlapping relation. Fig. 4 is a longitudinal sectional view through one of the yokes. Fig. 5 is a longitudinal sectional view through the second yoke. Fig. 6 is an enlarged sectional view through the caps covering the lubricating tubes.

In grain drills there is provided disks 10 which are rotatably mounted in pairs by means of the cultivator frame, a portion of which is indicated by the numeral 11. These disks have their forward and lower end portions extending adjacent each other and have their rear and upper end portions spread apart so that the disks will cut into the ground thus forming a furrow into which the grain will be dropped by means of a suitable spout leading from the usual grain box of the grain drill. The feeding spout is not shown as it does not form part of the invention. As a rule, the rear portions of the disks are held apart by a straight bar but this soon wears and then the forward portions of the disks will not be held close together and will not form a proper furrow thereby causing the grain to be dropped upon the upper face of the soil and not into a furrow. With this device, the disks will be at all times held in the proper position and will be prevented from spreading at their forward and lower end portions.

The frame 12 of this attachment is connected with the arm 13 of the grain drill and extends between the two furrow forming disks with one arm 14 elongated and bent to provide a guard 15 which extends inwardly beyond the lower end of the arm 16 thus protecting the rollers 17 and 18 and springs 19. The rollers 17 and 18 are rotatably mounted in the yokes 20 and 21 which are pivotally mounted in the frame 12 by means of the rod 22 which extends through openings 23 formed in the upper end portions of the yokes. Therefore these yokes can swing upon the pivot rod 22 to bring the rollers 17 and 18 into engagement with the disks 10. These yokes are yieldably held in the position to retain the rollers in engagement with the disks by means of the spring 19 which is mounted upon the pins 24 extending from the reduced ends or fingers 25 of the yokes. It will thus be seen that the rollers will at all times be held in engagement with the disks and cannot move out of engagement with the disks. It will be further seen that the spring 19 will provide resilient means for securely holding the two furrow forming disks in the proper relative position.

The arm 14 of the frame 12 is provided with a neck 26 which is closed by a cap 27 hingedly mounted as shown at 28 and yieldably held in the closed position by means of spring 29 as shown in Fig. 6. Conduits 30 and 31 are formed in the arms of the yokes and terminate at their upper ends in pipes 32 and 33 which pass into the neck 26. If desired the neck 26 may be left off as shown in Fig. 2. Of course, the openings through which the pipes 32 and 33 pass must be of sufficient size as shown in Fig. 3 to permit these yokes to have the necessary relative movement to hold the rollers in tight engagement with the furrow forming disks. When oil is forced into the conduits, it will pass through the conduits and will lubricate the axles 34 of the rollers thus permitting these rollers to rotate easily. It will thus be seen that when in use, the furrow forming disks of the grain drill will be held in the proper relative position and cannot move out of the proper position after the grain drill has been used for some time. It will further be seen that this attachment is comparatively simple in construction and is so constructed that it may be readily applied to grain drills already in use in place of the straight metal bars commonly used. If desired a scraper or a pair of scrapers may be connected with each of the guards 15, the scrapers fitting against the guards and means held in place by screws or other adjustable fasteners which are carried by the guards and passed through slots formed in the scraping blades. Therefore these scraping blades may be adjusted to engage the faces of the disks 10 and wear upon the scrapers taken up.

What is claimed is:—

1. A grain drill attachment comprising a frame having arms extending in spaced relation with one of the arms elongated and bent to extend beneath the free end of the second arm to provide a guard, yokes pivotally mounted in said frame between the arms thereof, rollers rotatably mounted in said yokes, and resilient means yieldably holding said yokes in a normal position and serving to swing the yokes outwardly.

2. An attachment of the character described comprising a frame, having depending arms, yokes pivotally mounted in said frame between the arms thereof, rollers rotatably mounted in said yokes, and resilient means yieldably holding said yokes swung outwardly of said frame.

3. A grain drill attachment comprising a frame having depending arms, yokes pivotally mounted in said frame between the arms thereof, rollers rotatably mounted in said yokes, pins extending from said yokes, and resilient means mounted upon said pins and engaging said yokes to yieldably hold the yokes extended outwardly beyond the sides of said frame.

4. A grain drill attachment comprising a frame including depending arms, yokes pivotally mounted in said frame between the arms thereof, rollers rotatably mounted in said yokes, one arm of said frame being provided with a neck, and conduits extending through the arms of said yokes and into the neck of said frame to provide lubricant passages for lubricating said rollers.

5. A grain drill attachment comprising a frame, yokes pivotally mounted in said frame, rollers rotatably mounted in said yokes, and means for yieldably holding said yokes in an extended position.

6. A grain drill attachment comprising a frame having means for suspending the frame between the furrow opening disks of a grain drill, roller supporting means pivotally connected with said frame, rollers carried by said suppporting means, and means for yieldably holding the roller supporting means in a normal position with the rollers extending beyond the sides of said frame for engagement with the furrow opening disks of a grain drill.

In testimony whereof I affix my signature in presence of two witnesses.

ARTHUR CZARNETZKI.

Witnesses:
HERMAN BOLTZ,
J. J. MILBRATH.

Copies of this patent may be obtained for five cents each, by addressing the "Commissioner of Patents, Washington, D. C."